US009832168B2

(12) United States Patent
Kloberdans et al.

(10) Patent No.: US 9,832,168 B2
(45) Date of Patent: Nov. 28, 2017

(54) SERVICE DISCOVERY WITHIN MULTI-LINK NETWORKS

(71) Applicant: Cable Television Laboratories, Inc., Louisville, CO (US)

(72) Inventors: Michael Kloberdans, Brighton, CO (US); Christopher Donley, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 307 days.

(21) Appl. No.: 14/334,027

(22) Filed: Jul. 17, 2014

(65) Prior Publication Data

US 2016/0006822 A1    Jan. 7, 2016

Related U.S. Application Data

(60) Provisional application No. 62/019,473, filed on Jul. 1, 2014.

(51) Int. Cl.
| | |
|---|---|
| *G06F 15/16* | (2006.01) |
| *H04L 29/06* | (2006.01) |
| *H04L 12/24* | (2006.01) |
| *H04L 29/08* | (2006.01) |
| *H04L 12/713* | (2013.01) |
| *H04L 29/12* | (2006.01) |
| *H04L 12/773* | (2013.01) |

(52) U.S. Cl.
CPC ...... *H04L 63/0272* (2013.01); *H04L 41/5054* (2013.01); *H04L 41/5058* (2013.01); *H04L 63/0236* (2013.01); *H04L 67/10* (2013.01); *H04L 67/16* (2013.01); *H04L 45/586* (2013.01); *H04L 45/60* (2013.01); *H04L 61/1511* (2013.01); *H04L 61/2015* (2013.01); *H04L 61/2507* (2013.01)

(58) Field of Classification Search
CPC .............................. H04L 67/16; H04L 67/10
USPC .................................................. 709/204, 225
See application file for complete search history.

(56) References Cited

U.S. PATENT DOCUMENTS

| | | | | |
|---|---|---|---|---|
| 2009/0010399 A1* | 1/2009 | Kim | ............... | H04L 12/2856 379/45 |
| 2010/0303003 A1* | 12/2010 | Park | ............... | H04L 67/20 370/328 |
| 2012/0087279 A1* | 4/2012 | Rinne | ............... | H04L 12/2425 370/254 |
| 2014/0244860 A1* | 8/2014 | Harikrishnan | ............... | H04L 61/2007 709/245 |
| 2014/0269703 A1* | 9/2014 | Sundaresan | ............... | H04L 45/04 370/390 |

* cited by examiner

*Primary Examiner* — Mahran Abu Roumi
*Assistant Examiner* — Marie Georges Henry
(74) *Attorney, Agent, or Firm* — Great Lakes IP, PLLC

(57) ABSTRACT

Facilitating service discovery and other operations across multiple local links is contemplated. The service discovery may be beneficial for use within local area networks (LANs) or other suitable multi-link or multi-segment networks where one or more of the links operates service discovery according to link-local messaging/addressing constraints.

17 Claims, 8 Drawing Sheets

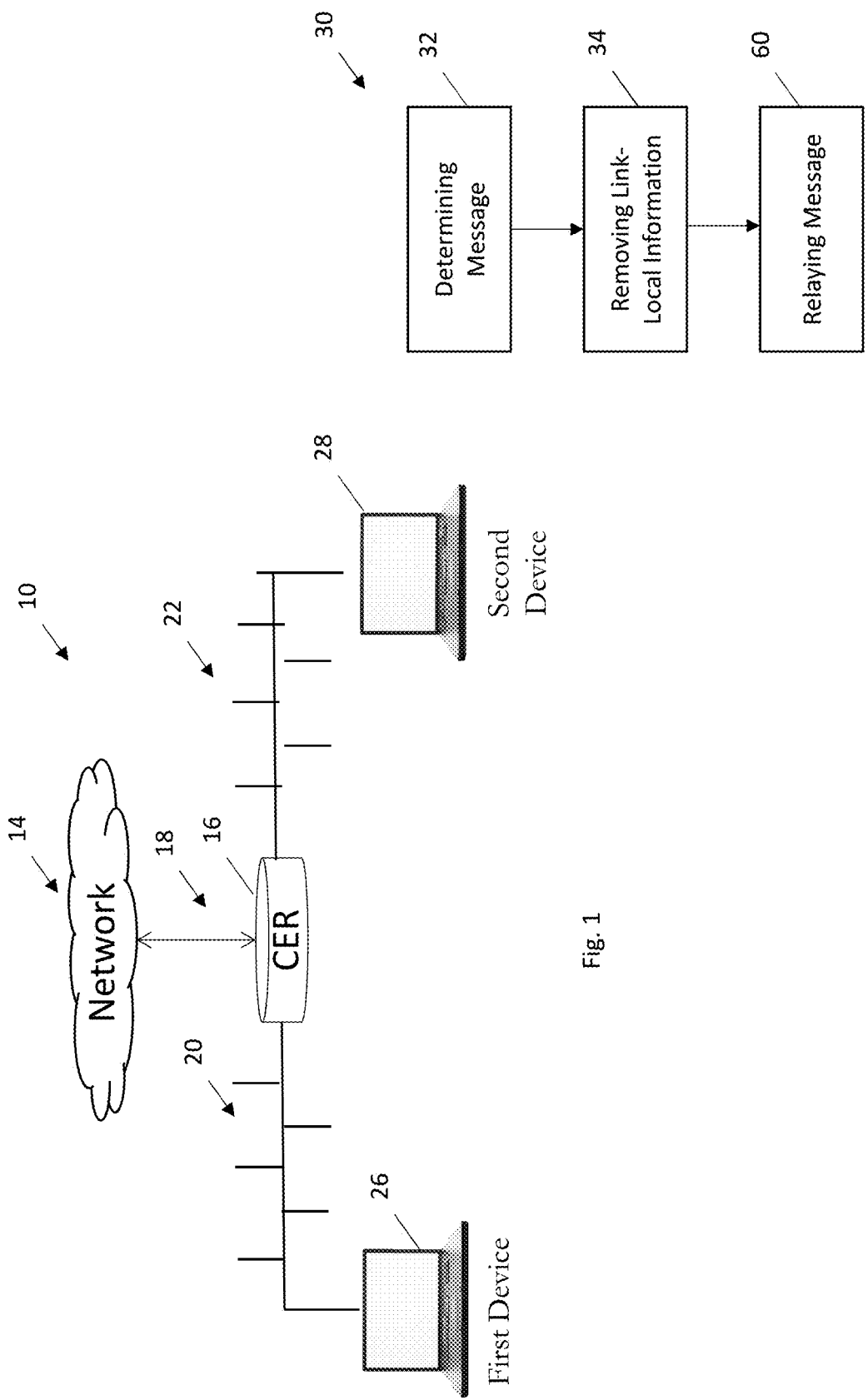

SERVICE DISCOVERY WITHIN MULTI-LINK NETWORKS

CROSS-REFERENCE TO RELATED APPLICATIONS

This application claims the benefit of U.S. provisional Application No. 62/019,473 filed Jul. 1, 2014, the disclosure of which is incorporated in its entirety by reference herein.

TECHNICAL FIELD

The present invention relates to facilitating service discovery and other operations across multiple local links, local area networks (LANs) or other suitable multi-link or multi-segment networks where one or more of the links operates according to link-local messaging/addressing constraints.

BACKGROUND

A multi-link network may be characterized as a network having a plurality of links or network segments connected together and arranged in a logical order. With the launch of new services, such as but not limited to home security, IP video, Smart Grid, etc., and more consumer devices being configured with routers, such as but not limited to televisions, mobile phones, appliances, etc., multi-link networks are becoming more prevalent. Multi-link networks require multiple routers or other sufficiently configured devices to communicate with each other over various network links in order to facilitate the establishment of service discoveries, messaging protocols, hierarchical relationships, address assignments, prefix delegations, security measures, backup capabilities and a potential number of additional functional capabilities needed for desirable network communications. As the prevalence of such multi-router networks continues to grow, one non-limiting aspect of the present invention contemplates a need to facilitate configuring gateways, routers and other devices to operate in such a complex environment.

The multi-router network may include a plurality of links, subnets or local area networks (LANs) where the number of such network segments may vary depending on the particular relationship between the inter-connected routers/devices. Within a home or other location for such multiple-link networks, a Domain Name System (DNS) server may be utilized for the purpose of discovering services available on devices connected to the various networks and optionally to facilitate resolving names for the devices offering services. Operation of a DNS server requires access to services outside of the multi-link network and can be complicated for some users to construct and maintain, particularly when implemented at the consumer level. Multicast DNS (mDNS), Bonjour and other service discovery protocols have been developed to combat the complexities of conventional DNS. The Internet Engineering Task Force (IETF) Request for Comments, 6762, entitled Multicast DNS, the disclosure of which is hereby incorporated by reference in its entirety, notes the ability to look up DNS resource record data types (including, but not limited to, host names) in the absence of a conventional managed DNS server may be useful.

RFC 6762 notes mDNS can provide the ability to perform DNS-like operations on a local link in the absence of any conventional Unicast DNS server by designating a portion of the DNS namespace to be free for local use, without the need to pay any annual fee, and without the need to set up delegations or otherwise configure a conventional DNS server to answer for those names. Some benefits of Multicast DNS names are that (i) they require little or no administration or configuration to set them up, (ii) they work when no infrastructure is present, and (iii) they work during infrastructure failures. mDNS is one example of a link-local type of message protocol where devices may be prevented from advertising services or otherwise facilitating service discovery across multiple links, i.e., the various links, subnets and LANs comprising the multi-link network, due to attendant link-local messaging/addressing requirements. One non-limiting aspect of the present invention contemplates facilitating service discovery and other operations using mDNS, Bonjour or other link-local protocols within a multi-link network so as to facilitate service discovery and other operations across an entirety of the multi-link network.

BRIEF DESCRIPTION OF THE DRAWINGS

FIG. 1 illustrates a multi-link system in accordance with one non-limiting aspect of the present invention FIG. 2 illustrates a flowchart of a method for facilitating messaging between local links in accordance with one non-limiting aspect of the present invention.

DETAILED DESCRIPTION

Figure 3:
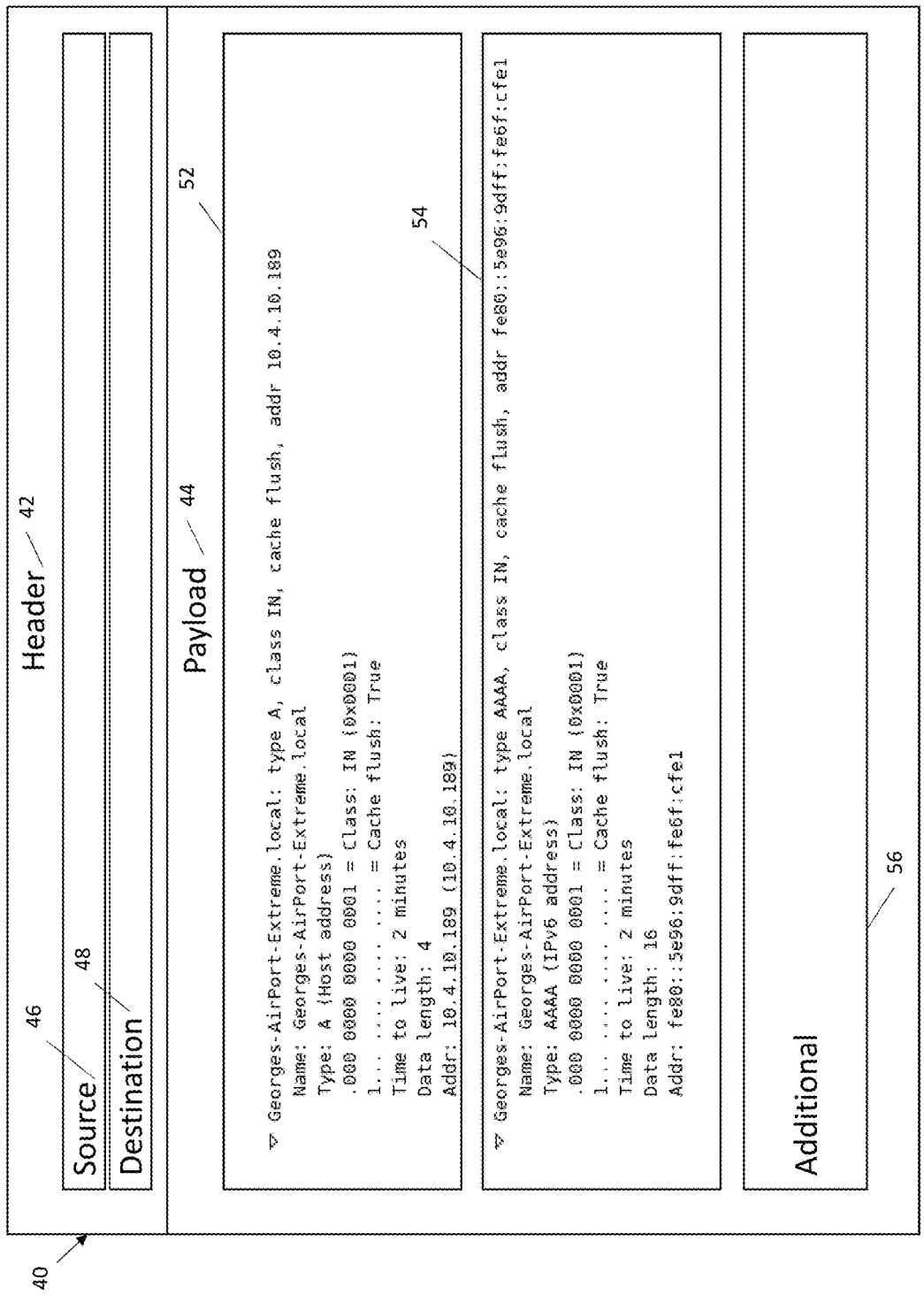
FIG. 3 illustrates an exemplary, mDNS format in accordance with one non-limiting aspect of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates a multi-link system 10 in accordance with one non-limiting aspect of the present invention. The system 10 illustrates one exemplary configuration where a delegating router (not shown) associated with an outside network 14 provides a prefix to a requesting router 16 for delegation within an inside network 18. The prefix may be any suitable addressing prefix, such as but not necessarily limited to an Internet Protocol version 6 (IPv6) prefix and an Internet Protocol version 4 (IPv4) prefix. Dynamic Host Configuration Protocol (DHCP), such as that described in Internet Engineering Task Force (IETF) request for comment (RFC) 2131, 3315 and 3633, the disclosures of which are hereby incorporated by reference in their entireties, or other suitable delegation processes may be employed to facilitate delegating the first prefix to the requesting router 16. The requesting router 16 may be configured to facilitate adaptively delegating the prefix to additional routers associated with the inside network 18, such as in the manner described in U.S. patent application Ser. No. 13/783,242, the disclosure of which is hereby incorporated by reference in its entirety.

The outside network 14 and the inside network 18 demonstrate one exemplary, non-limiting use of the present invention where a multiple system operator (MSO), Internet service provider (ISP) or other type of service provider is allocated a prefix or addressing domain by a suitable addressing entity to facilitate Internet-based messaging or other network-based messaging. The inside network 18 is shown to be distinguished from the outside network 14 to demonstrated one use case where an MSO may be tasked with facilitating messaging for a plurality of inside networks or local links, such as but not necessarily limited to home networks or other internal networks associated with its subscribers. While only one inside network 18 is illustrated, the MSO may be responsible for facilitating prefix delegation with any number of inside networks or other downstream connected networks. The requesting router 16, which may be periodically referred to herein as a customer edge router (CER) or edge router (ER) tasked with relaying messages between a first link 20 and a second link 22. The links 20, 22 may be considered to be separate networks or segments for the purposes of supporting link-local communications, such as multicast Domain Name System (mDNS) messaging described in RFC 6762, Bonjour, etc.

The CER 16 may be configured to comply with RFC 6204, RFC 6204BIS, and IPv4 and IPv6 eRouter Specification (CM-SP-eRouter-I08-120329), the disclosures of which are hereby incorporated by reference in their entirety. The CER 16, and optionally additional internal routers (IR) included to facilitate additional links, may also be configured to facilitate various operations, such as adaptive prefix delegation, role based router functionality, interface directionality assignment and/or overly networking, such as in the manner described in United States patent application Ser. Nos. 61/712,318, 61/771,807, 13/783,242, 13/792,023, 13/792,016, 13/836,948 and 13/652,700, the disclosures of which are hereby incorporated by reference in their entireties. The CER 16 may to include a Domain Name System (DNS) server and/or resolver configured to facilitate DNS related messaging over at least the inside network 18. The CER 16 may be configured to facilitate the DNS capabilities described in RFCs 1032, 1034 and 1035, the disclosure of which are hereby incorporated by reference in their entireties. As noted in RFC 1035, the contemplated DNS capabilities may be used to provide a mechanism for naming resources in such a way that the names are usable in different hosts, networks, protocol families, internets, and administrative organizations.

One non-limiting aspect of the present invention contemplates the CER 16 lacking a DNS server, or optionally operating with the DNS server being disabled or inactive, and instead being configured to perform DNS-like operations on a local links, e.g., the first link 20 and the second link 22, according to mDNS. mDNS is one example of a link-local type of message protocol where devices 26, 28 connected to different local links (one device 26, 28 is shown to be connected to each link 20, 22 but additional number devices may be connected thereto) may be prevented from advertising services or otherwise facilitating service discovery across multiple links, i.e., the various links, subnets and LANs comprising the multi-link network, due to attendant link-local messaging/addressing requirements. One non-limiting aspect of the present invention contemplates facilitating service discovery and other operations using mDNS, Bonjour or other link-local protocols within a multi-link network so as to facilitate service discovery and other operations across an entirety of the multi-link network, or at least two, disparate links 20, 22 operating according to link-local addressing requirements. The present invention is predominately described with respect to mDNS for exemplary non-limiting purposes as similar messaging protocols and techniques may be utilized without deviating from the scope and contemplation of the present invention.

The CER 16 may include a computer-readable medium having a plurality of instructions sufficient for controlling or otherwise facilitating exchanging mDNS and/or other messages between the first and second links 20, 22. FIG. 1 illustrates a simplified view of the inside network 18 having with the first and second links 20, 22 separated by the CER 16 as the present invention fully contemplates the inside network 18 including any number of separate, local links or other network segments and/or any number of additional routers or devices having router capabilities arranged in hierarchical order, e.g. the first device 26 may be configured to separate additional subordinate local links, including capabilities described with respect to the CER 16 to facilitate exchanging link-local messages between independently operable local links. The first and second links 20, 22 are shown with solid lines to demonstrate network connections as the communications may be carried over the local links through wireline, wireless and/or a combination of wireline and wireless signaling. The first and second devices 26, 28 are similarly shown for illustrative, non-limiting purpose as computers as the present invention fully contemplates the devices 26, 28 being any type of device have capabilities consistent with the operations contemplated herein, including but not limited to mobile phone, tablets (second screen device), set-top boxes (STBs), gateways, appliances, security systems, etc.

FIG. 2 illustrates a flowchart 30 of a method for facilitating messaging between local links 20, 22 in accordance with one non-limiting aspect of the present invention. The method is described with respect to facilitating service discovery utilizing mDNS related messaging for exemplary non-limiting purposes as mDNS or non-mDNS messaging may be facilitated for purposes other than service discovery. The method is also described for exemplary non-limiting purposes with respect to facilitating message exchange between the above-described first and second links 20, 22 by way of the CER 16 as the contemplated messaging may facilitate exchanges amongst any number or hierarchy of local links. Block 32 relates to determining a first message suitable to facilitating service discovery across multiple local-links, e.g., an mDNS query message transmitted from the first device 26 over the first link 20. The first message may be multicasted over the first link 20 to all connected devices and/or unicast to the CER 16 or other device to determine the presence of other connected devices, to announce services and/or to perform any number of other operations consistent with mDNS or other link-local messaging. The CER 16 may determine the first message and its suitability to be shared over the second link 22 or other links within the inside network 18 or other network within its domain.

Block 34 relates to the CER 16 identifying and removing link-local information included within the first message. The link-local information may be any information having data or other values meaningful only on the first link 20 (originating link), such as but not necessary limited to link-local addressing (e.g., link-local addressing assigned according to IETF RFC 3927, entitled Dynamic Configuration of IPv4 Link-Local Addresses, the disclosure of which is hereby incorporated by reference in its entirety) and/or link-local domain names associated with the first device 26 originating the first message. RFC 6762 notes link-local may include utilizing the DNS top-level domain ".local." as a special domain with special semantics, namely that any fully qualified name ending in ".local." is link-local, and names within this domain are meaningful only on the link where they originate. Corresponding unicast addressing may be analogous to IPv4 addresses in the 169.254/16 range or IPv6 addresses in the FE80::/10 range and corresponding multicast addressing may be analogous to IPv4 address in the 224.0.0.0/24 range or IPv6 addresses in the FF02::/16 range. The CER 16 may also identify non-link-local information included within the first message. The non-link-local information may be any information having data or values meaningful beyond the first link 20, such as but not necessary limited to globally unique addressing, globally unique domain names and/or characteristics or operating capabilities associated with the first device 26 originating the first message. The link-local and non-link-local information may be ascertained according to a format or structure of the first message, such as a function of data types or other fields identifying information included therein and/or specified within a corresponding data sheet or protocol.

FIG. 3 illustrates an exemplary, mDNS format 40 for the first message or other messages capable of being relayed with the CER 16 in the manner contemplated by one non-limiting aspect of the present invention. The message is shown to include a header 42 and a payload 44. The header 42 may specify information associated with facilitating communications, including a source address 46 and a destination address 48, respectively referred to as a first source address and a first destination address, and the payload 44 may specify information intended to for transmission, including one or more resource records 52, 54, 56. The resource records 52, 54, 56 may be portions of the payload 44 or other fields within the first message carrying link-local and/or non-link-local information as required by mDNS. The exemplary illustration includes a first resource record 52 containing type A, link-local addressing information, a second resource record 54 containing type AAAA, non-link-local addressing information and a third resource record 56 containing additional, non-addressing information used to communicate other information regarding the first device 26. Of course, the first message may include any number of resource records 52, 54, 56 and other mechanisms to facilitate the transmission of link-local and non-link-local information. Optionally, the third resource 56 record may be omitted in the event the corresponding information is included elsewhere or otherwise understood and/or in the event the first message need only identify the addressing information associated with the first device 26 or responding device 28, e.g., the first and second resource records 52, 54 or additional addressing resource records.

Returning to FIG. 2, Block 60 relates to relaying the first message, which for exemplary non-limiting purposes is referred to as a second message, from the first link 20 to the second link 22. The CER 16 may relay the second message as a multicast or unicast transmission over the second link for communication to the second device and/or other devices connected thereto. The CER 16 may generate the second message according to information included within the first message and/or other information provided thereto, e.g., the CER 16 may be apprised of addresses and other information for the second device 28 or other devices and/or operational constraints of the second link 22. One non-limiting aspect of the present invention contemplates generating the second message to be essentially a replication of the first message with the link-local information and addressing being removed or otherwise adjusted to facilitate communication over the second link 22. The second message may be generated by dropping or excluding the link-local information and including the non-link-local information, e.g., the first resource record 52 may be excluded or dropped and the second and third resource records 54, 56 may be included. The second message may include changes to the source and destination addresses 46, 48, referred to when used in the second message as a second source address and a second destination address, to compensate for addressing requirements of the second link.

Figure 4:
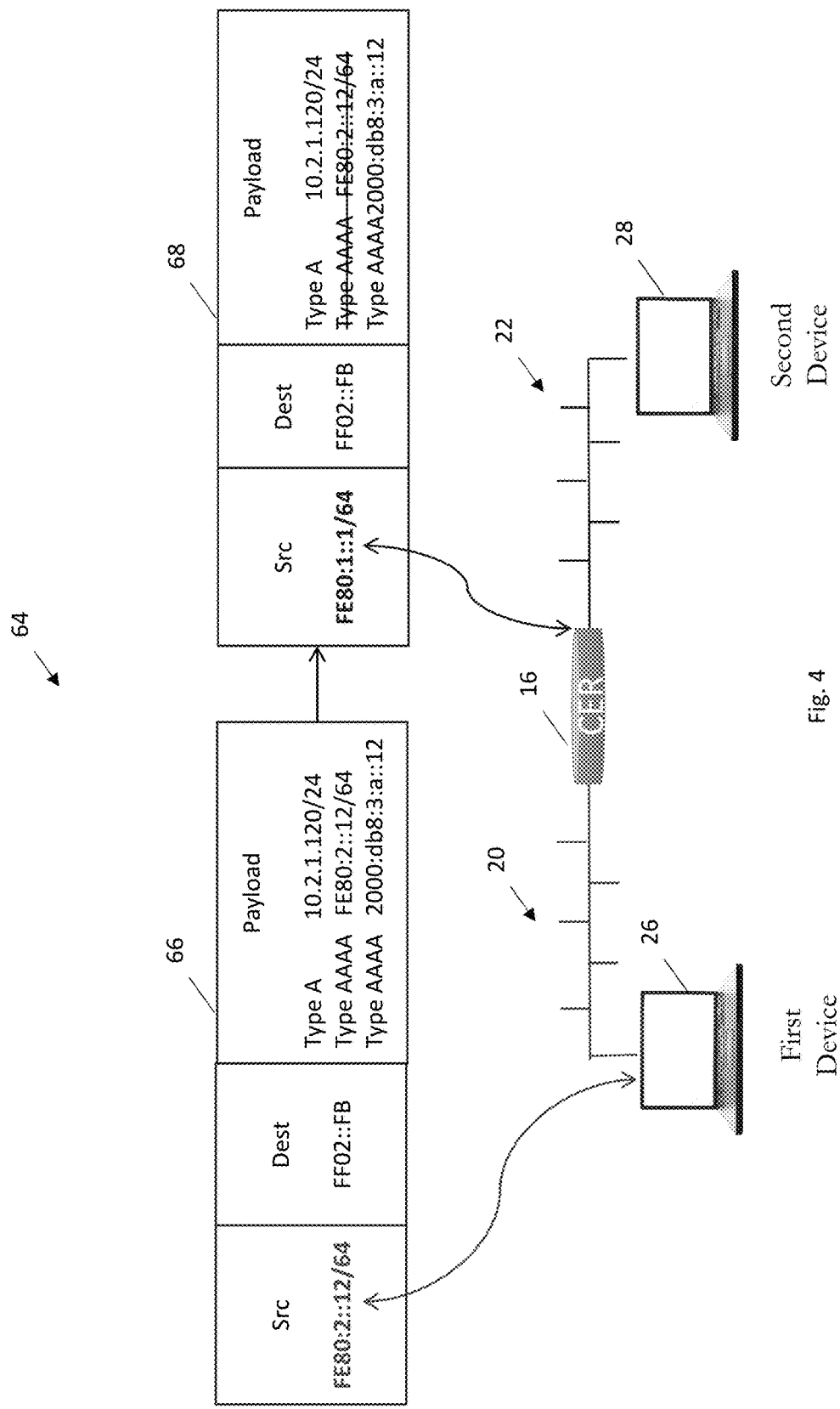
FIG. 4 illustrates a schematic for facilitating a multicast query having link-local information in accordance with one non-limiting aspect of the present invention.

FIG. 4 illustrates a schematic 64 for facilitating a multicast query having link-local information in accordance with one non-limiting aspect of the present invention. The query may be instigated with the first device 26 multicasting a first message 66 (query) over the first link 20 whereupon the CER 16 detects the first message 66 and relays it as a second message 68 over the second link 22. The first message 66 is shown to include a first source address (src), a first destination address (dest) and a payload. The first source address may be a unicast link-local address assigned to the first device, shown as FE80:2::12, and the first destination may be a multicast, link-local address, shown as FF02::FB. The payload is shown to include three resource addressing records shown as first resource record containing a non-link-local, Type A record having address 10.2.1.120, a second resource record containing a link-local, Type AAAA record having address FE80:2::12 and a third resource record containing a non-link-local, Type AAAA record having address 2000:db8:3:a::12. The CER 16 may relay the first message 66 by generating the second message 68 to include a second source address having a unicast, link-local address assigned to it, shown as FE80:1::1, a second destination address matching the first destination address and a payload including the first and third resource records, i.e., with the second resource record being dropped.

Figure 5:
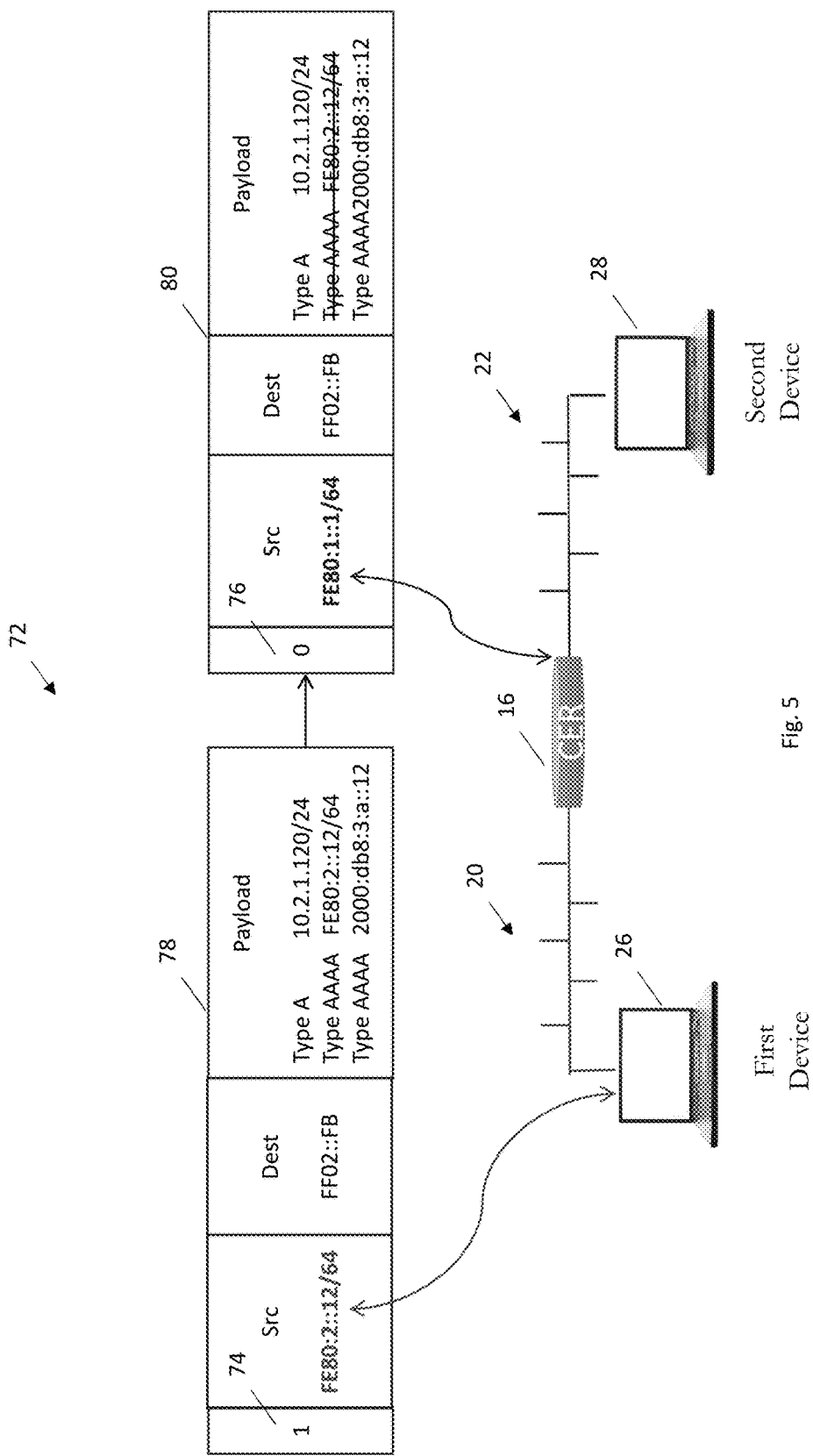
FIG. 5 illustrates a schematic for facilitating a multicast query having link-local information with a query unicast (QU) bit being set in accordance with one non-limiting aspect of the present invention.

FIG. 5 illustrates a schematic 72 for facilitating a multicast query having link-local information with a query unicast (QU) bit 74, 76 being set in accordance with one non-limiting aspect of the present invention. The QU bit 74 may be included within a header of a corresponding first message 78 to designate acceptance of unicast responses being transmitted thereto when set to high, e.g., with a bit value of 1. The use of the QU bit 74, 76 is described in RFC 6762 it may be utilized to designate the use of unicast responses when devices announce presence or execute other operations that need not be multicasted to all connected devices, e.g., to ameliorate traffic. The setting of the QU bit 74 value to 1 in FIG. 5 may be contrasted with the multicasted query described in FIG. 4 where the QU bit (not shown) may have been assumed to set equal to a bit value of 0, thereby indicating responses thereto are to be multicasted to a well-known multicast address (e.g., FF02::FB). In addition to removing the link-local information described above with respect to FIG. 4, the CER 16 may relay the first message 78 as a second message 80 by also changing the QU bit 76 to a value of 0. The changing of the QU bit value may then cause any responses to be multicasted instead of unicasted thereby causing the response to be communicated to all connected devices while eliminating a need for the CER 16 to keep track of unicast addresses when responsively relaying the response to the first link.

Figure 6:
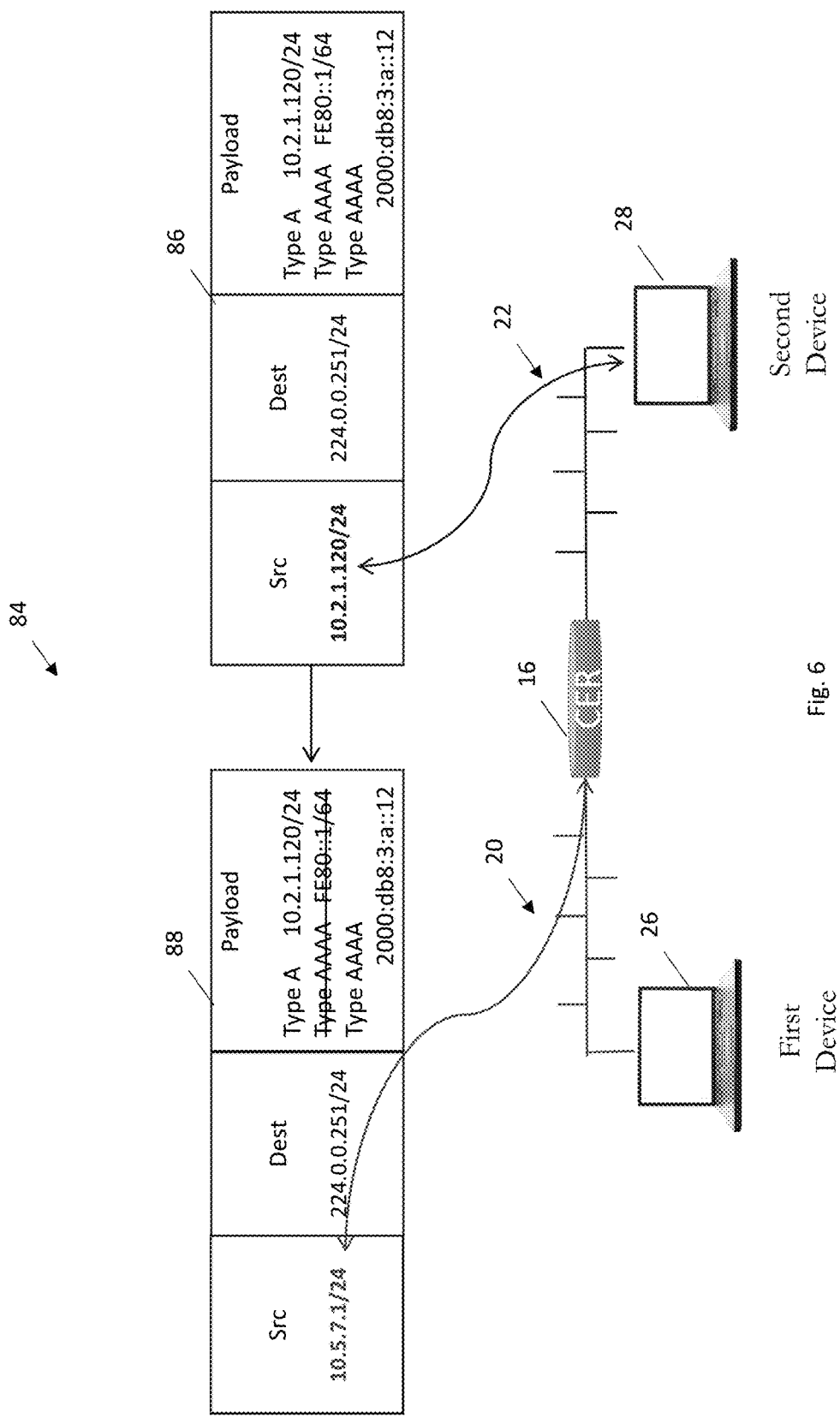
FIG. 6 illustrates a schematic for facilitating an announcement having link-local information with IPv4 addressing in accordance with one non-limiting aspect of the present invention.

FIG. 6 illustrates a schematic 84 for facilitating an announcement having link-local information with IPv4 addressing in accordance with one non-limiting aspect of the present invention. The announcement may correspond with a first message 86 being originated from the second device 28 and relayed by way of the CER 16 to the first link 20 as a second message 88. The first message 86 is shown to include a first source address being a non-link-local, unicast IPv4 address assigned to the second device, shown as 10.2.1.120, a first destination address being a link-local, multicast IPv4 address, shown as 224.0.0.251, and a payload including the first, second, and third resource records described above. (The addressing within the payload originating from the second device may be different and is shown for illustrative purposes as the addressing within the payload shown above with respect to the first device). The CER 16 may generate the second message by removing the link-local resource records (e.g., the second resource record), including the non-link-local resource records (e.g., the first and third resource records), generating a second source address to correspond with a non-link-local, unicast IPv4 address assigned to the CER for use over the first link, shown as 10.5.7.1, and including a second destination address corresponding with the first destination address.

Figure 7:
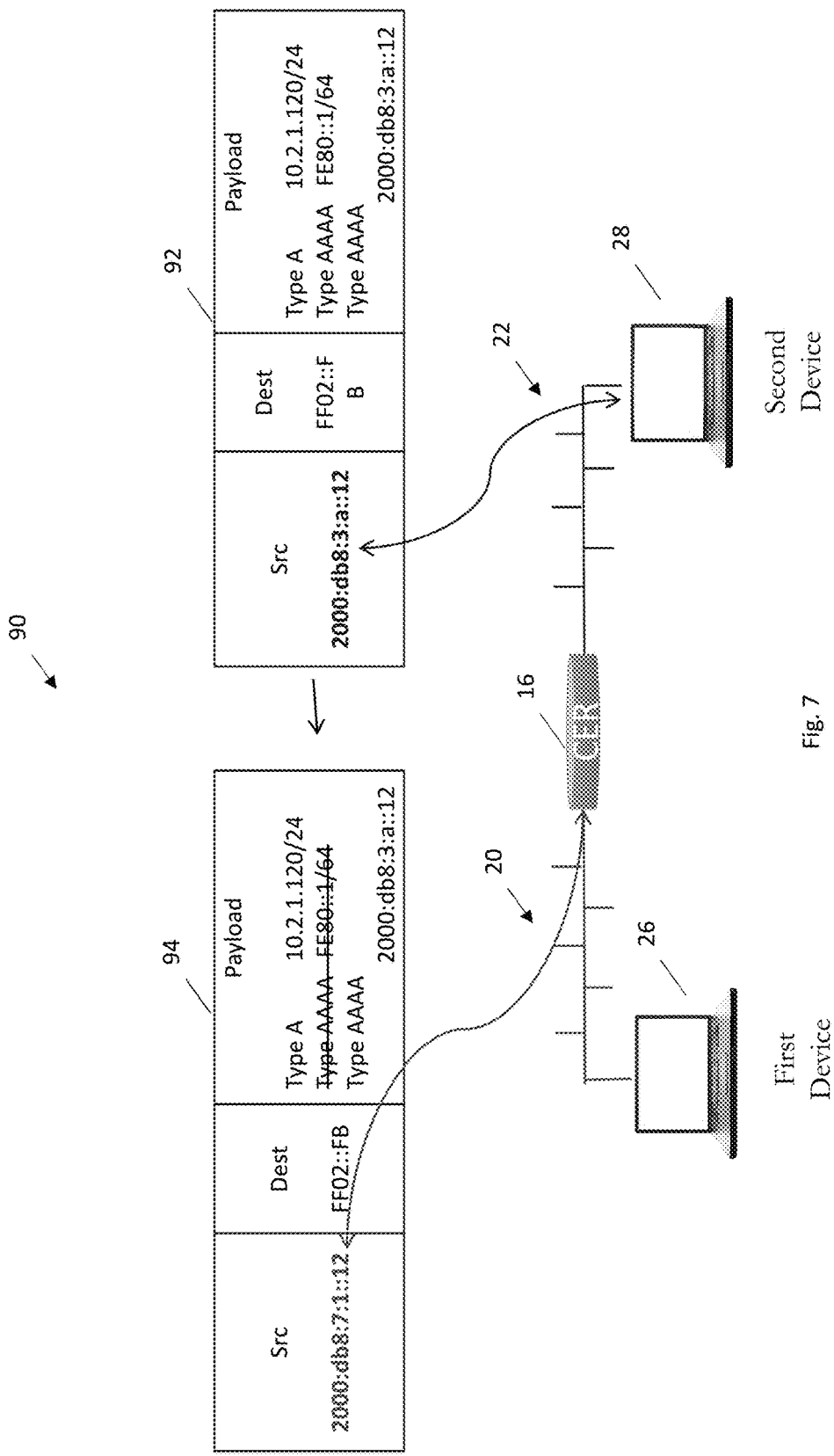
FIG. 7 illustrates a schematic for facilitating an announcement having link-local information with IPv6 addressing in accordance with one non-limiting aspect of the present invention.

FIG. 7 illustrates a schematic 90 for facilitating an announcement having link-local information with IPv6 addressing in accordance with one non-limiting aspect of the present invention. The announcement may be facilitated in a manner similar to that described above with respect to FIG. 6 with IPv6 addresses being used in place of the described IPv4 addresses to facilitate relaying a first message 92 as a second message 94. The CER 16 may be configured with IPv4 and/or IPv6 addresses and to select appropriate use of the corresponding IPv4 and IPv6 addresses depending on whether the message being received for relay includes IPv4 or IPv6 addressing, e.g., the CER 16 may select addressing for the second message as IPv4 if the received message has IPv4 addressing and as IPv6 if the received message has IPv6 addressing. Optionally, the CER 16 may be configured to adjust or switch between IPv4 and IPv6 addressing depending on operational constraints of the first and second links 20, 22. In the event the second link 22 operates according to IPv6 addressing and the first link 20 operates according to IPv6 IPv4 addressing, the CER 16 may be configured to change IPv6 addressing for messages received from the second link 22 to IPv4 addressing when communicated over the first link 20 (this implementation is not shown).

Figure 8:
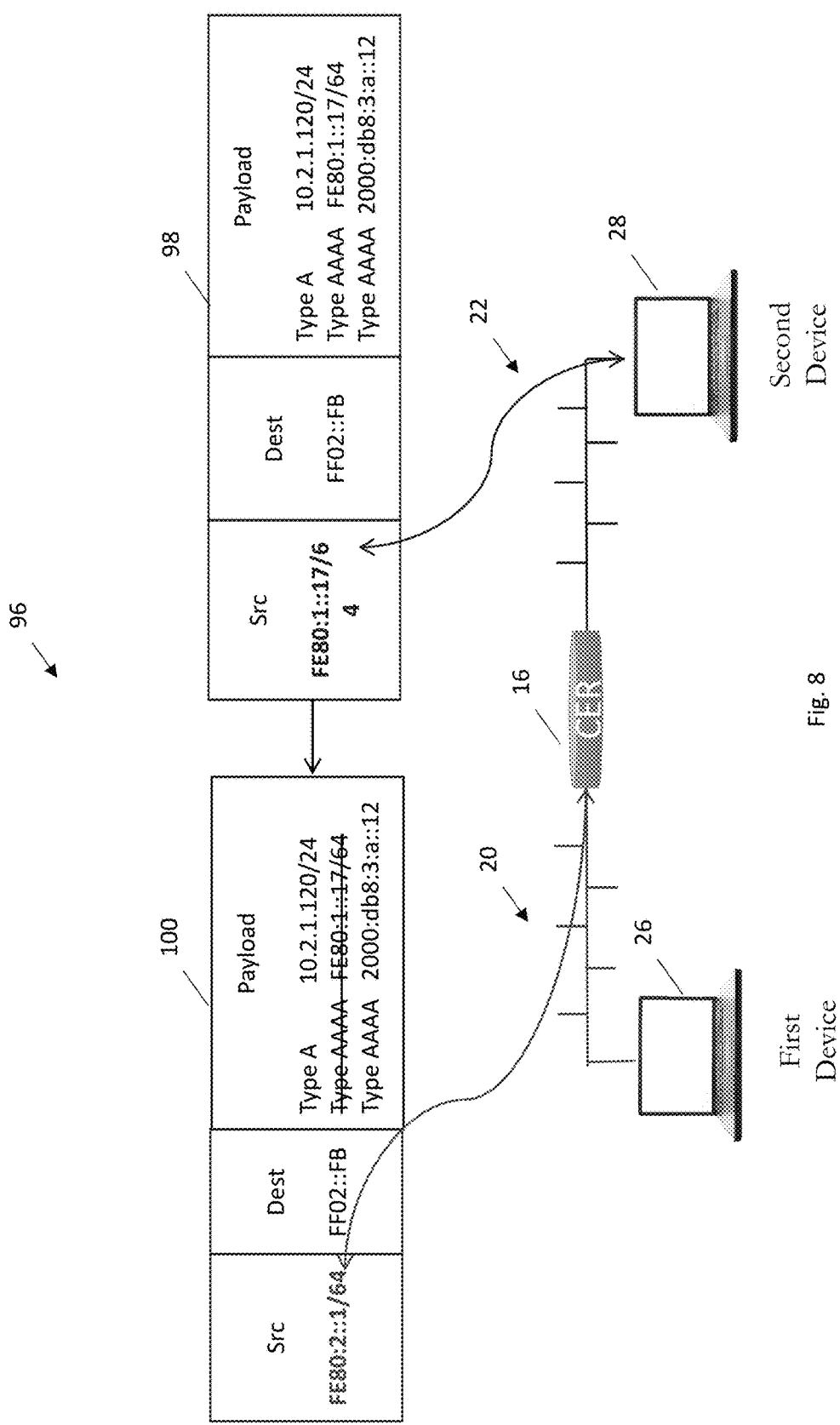
FIG. 8 illustrates a schematic for facilitating a multicast response having link-local information in accordance with one non-limiting aspect of the present invention.

FIG. 8 illustrates a schematic 96 for facilitating a multicast response having link-local information in accordance with one non-limiting aspect of the present invention. The response may be issued as a first message 98 from the second device 28 following receipt of a corresponding query message (e.g., see FIG. 4 or 5) and relayed to the first link 20 by the CER 16 as a second message 100. In this manner, the CER 16 may be configured to facilitate receiving queries from the first link 20, relaying the queries to the second link 22, receiving responses to the query from devices connected to the second link 22 and relaying the responses back to the first link 20, thereby enabling service discovery across multiple links in a multi-link network where two or more of the links 20, 22 operate according to link-local information and/or addressing. The first message 98, i.e., the response, is shown to include a link-local, unicast source address assigned to the second device, a link-local, multicast destination address a payload including the first, second, and third resource records described above. The first and second destination address may be matched, link-local addresses as the corresponding multicast address may be employed on both the first and second links 20, 22 to distribute messages, as with the illustrated messaging, the destination address may be changed when relaying messages without deviating from the scope and contemplation of the present invention.

Figure 9:
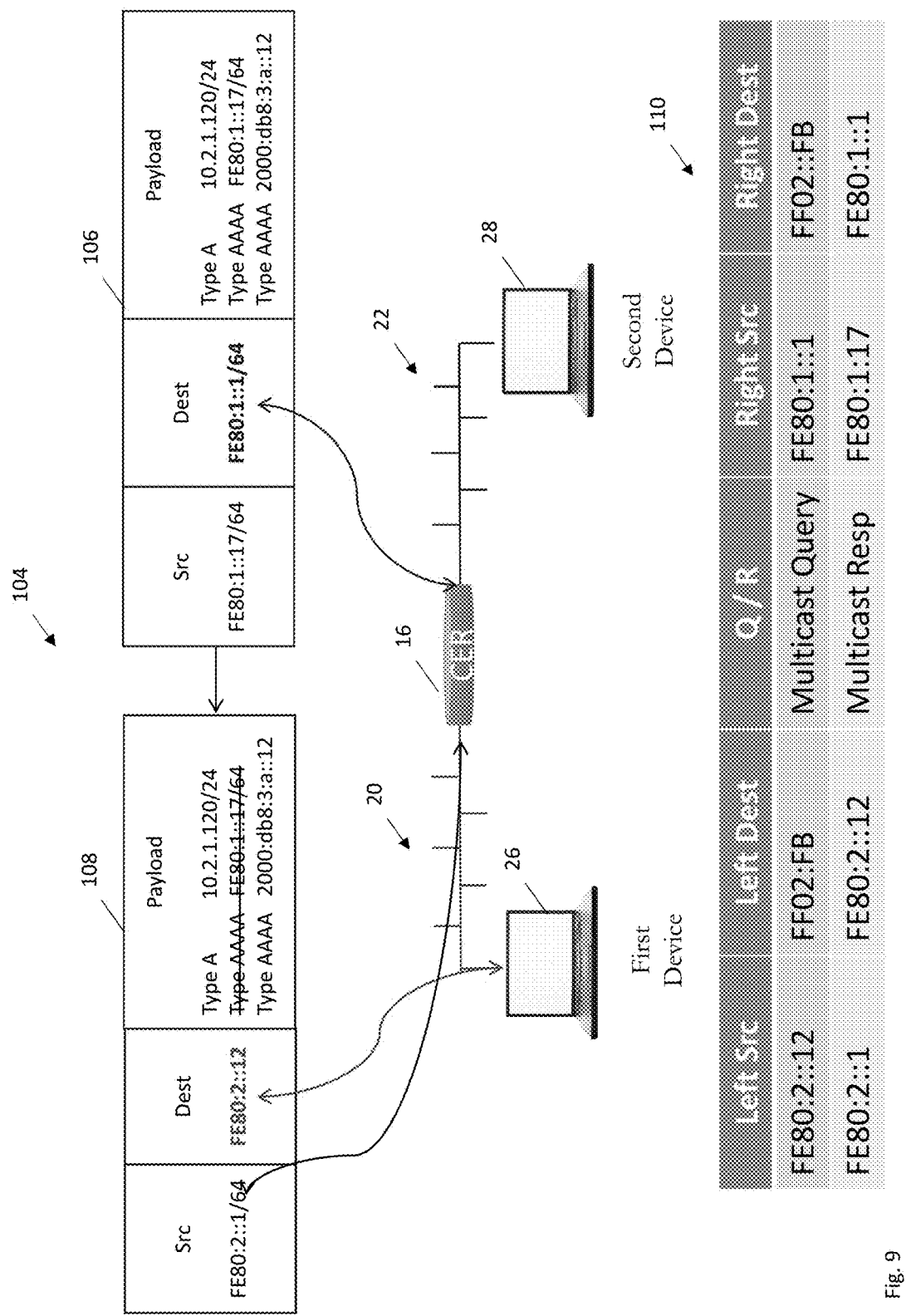
FIG. 9 illustrates a schematic for facilitating a unicast response having link-local information in accordance with one non-limiting aspect of the present invention.

FIG. 9 illustrates a schematic 104 for facilitating a unicast response having link-local information in accordance with one non-limiting aspect of the present invention. The response may be issued as a first message 106 from the second device 28 following receipt of a corresponding query message, such as a query where the QU bit was not changed in the above-described manner from a bit value of 1 to a bit value of 0. The unicast response may be differentiated from the above messaging, and identified by the CER 16 accordingly, due to a first destination address specifying a unicast address instead of a multicast address, which is shown to correspond with a link-local, IPv6 address of FE80:1::1/64. The first source address and a payload may be similar to the above described first source addresses and payloads where a first source address is a link-local address assigned to the second device and a payload includes multiple resource records where at least one of the resource records is link-local (e.g., the second resource record). The CER 16 may relay the first message 106 as a second message 108 with the link-local resource record removed and with new addresses for a second source and destination address in order to compensate for the unicast addressing in the first message.

The second source address is shown to correspond with a link-local, IPv6 address assigned to the CER 16 for use over the first link 20 (FE80:2::1), which for exemplary purposes is shown to be different than the CER address (FE80:1::1) used on the second link 22 as the CER may use the same link-local address on both the first and second links 20, 22. The second destination address (FE80:2::12) is shown to correspond with a link-local, IPv6 address assigned to the first device 26. The second destination address may be determined by the CER 16 tracking a query triggering the response (first message), such as in a routing table 110. The routing table 110 may include state information regarding the exchange of queries and responses so as to facilitate directing responsive messages to the device originating the prior message causing the response. The routing table 110 illustrates addressing for a multicast query prompting the second device 28 to transmit the response in a first row and addressing for the corresponding response within a second row. In implementations where it may be desirable to limit complexity or other processing having to be performed by the CER 16 to maintain state information for the unicast message routing contemplated in FIG. 9, the QU bit maybe change in the above-described manner, e.g., the QU bit of the query associated with the first row may be set to zero in accordance with FIG. 5.

As supported above, the present invention contemplates facilitating service discovery, message routing or other exchanges between multiple links within a multi-link network operating according to link-local requirements. The message routing may include relaying messages from the one linked to another by adjusting link-local addressing, including non-link-local information and removing link-local information. The foregoing presumes that at least one of the resource records included within the payload is link-local such that it requires removal before the corresponding message is relayed to another local link within the multi-link network. This is done for exemplary non-limiting purposes as the present invention fully contemplates some messaging including payloads without link-local information. In the event a message to be relayed across local links fails to include link-local resource records, the corresponding messages may be similarly relayed to another local link by changing the source and/or destination addresses and the non-link-local resource records.

One non-limiting aspect of the present invention home networks becoming more complex with multiple networks (links or subnets). mDNS, defined in RFC 6762, describes a method for consumer network devices to advertise services such as file sharing, printing, photos, music, etc.; to name and find those devices without a DNS server in the home network, which only works in one network (subnet) and is stopped by a router interface. The present invention enables and extends mDNS messages between multiple routed domains to provide service to all devices in the home regardless of the number of private networks in the home. mDNS is a protocol that may be used to create a domain called .local for use on one link (subnet) to name devices that provide services and advertise those devices/services without the need for a DNS server. Names such as "Bens_computer.local." or "HPprinter2.local." are examples of this automatic naming structure using mDNS. All Apple products (Mac Book, iPad, iPod, iPhone, Apple Airport, iTunes, iPhoto, etc.), a host of other chat and messaging products/protocols use mDNS. Safari browser uses mDNS to locate web servers. Asterisk servers use it to advertise telephone services. Beyond the MAC OS, mDNS can be used by Linux, BSD, Windows, Solaris and VXworks. All current HP printers support mDNS for printer discovery. Therefore, mDNS support and use is widespread.

One problem is that mDNS can only be used in one broadcast domain (link or subnet) unless a DNS server is used. Most home networks do not have a DNS server or want the technical complexities a DNS server would require. This invention extends mDNS multicast queries and responses to other links or subnets to make the entire small office and home office (SoHo) act like one broadcast domain for mDNS messages, thereby enabling all devices with services to be discovered and advertised to all hosts on multiple networks in the SoHo. mDNS reserves two multicast IP addresses for the purpose of querying for, and listening to, devices that offer services. These multicast addresses are FF02::FB for IPv6 and 224.0.0.251 for IPv4 networks. One non-limiting aspect of the present invention allows a router to relay (optionally, not proxy) mDNS frames to a different link/subnet by listening for mDNS multicast messages on a well-known IP addresses and placing them on the new link/subnet by changing the IP source address in the IP packet and removing any Link Local IP addresses in the mDNS payload. The reason this must be done is that there are conditions where the source IP address is checked to verify it is part of the local link/subnet. If a packet fails this test, that packet is silently discarded (see sections 5.5 and 11 of RFC 6762). Therefore, because of this verification test, and for good networking practices, the router may change the original source IP address with the IP address of the router's egress interface.

mDNS payloads must contain all applicable IP addresses of the querier and responder IP devices. These can include the unique IPv4 address statically assigned; leased by a DHCP server or using an IPv4 Link Local address (169.254.x.x). For IPv6, the payload can contain an IPv6 GUA, or an IPv6 ULA and in addition, an IPv6 Link Local address. A Link-Local IP address never makes sense to forward (relay) to a different link/subnet because it only has context on the link/subnet it belongs. Also, it is possible that two links/subnets could have the same Link-Local IP address and a conflict could happen. Therefore, one aspect of the present invention contemplates removing any Link-Local IP addresses from the mDNS payload before the packet is placed on the new link/subnet, thereby allowing advertising, querying and responses across different links/subnets without the need for administration by the user or the addition of a DNS server onto the network.

HP printers and Apple products are pervasive in home networks. Home networks are becoming more complex with multiple routers and/or links/subnets, yet most subscribers will not increase their knowledge of networking (IPv6, mDNS, UPnP, etc.). One aspect of the present invention contemplates simplifying a subscriber's life by providing multi-link relay of mDNS with zero configuration by the subscriber. A multiple system operator (MSO) that offers this worry-free system has more value than competitors that would not have this invention to utilize. One aspect of the present invention contemplates also lays the platform for future enhancements for the home network of the future, which may be part of the eRouter and any off-the-shelf routers that a subscriber may purchase.

Some enterprises provide 100 Mbps bandwidth to the desk for office employees. Some home routers also provide 100 Mbps bandwidth or more to users, yet the data traffic levels are much less on a home networks. Some responses to queries are multicast so that all devices can know when a service is available or if a state changes. However, mDNS RFC 6762 states it is sometimes desirable for a response to be unicast. One example of an appropriate unicast message is if a sleeping laptop wakes, e.g., no service changes may have occurred, yet the waking action produces services to be advertised. No other devices need this information, so a unicast makes sense to save network bandwidth in an enterprise network. If the high bit in a query message's answer field is set, the response should be unicast instead of multicast—as in the case of a waking laptop. A unicast mDNS response, if relayed to a different link/subnet, requires the home router(s) to change not only the source IP address (and possibly payload contents), but also the destination IP address. The added burden is that the home router(s) must keep state information similar to an IPv4 ARP request because the responding device sees the router interface as the destination. The router has to remember the ultimate destination by keeping a table and changing the IP destination to the correct IP address as the response goes through the router to a different link/subnet.

For the home network, since network bandwidth is plentiful, multicast responses are not a burden and eliminating unicast responses removes excessive processing burden and nullifies the need to keep state information from mDMS transactions. One aspect of the present invention contemplates changes the router's role from being a proxy to being a relay—much simpler and robust. This may include changing the QU flag for a unicast response to a QM flag that changes the response to a multicast message as the query moves to a different link/subnet. Router vendors may experience a much easier time implementing site-scoped mDNS if unicast responses are changed to multicast. Simplicity is especially valued in home networks and this invention may keep mDNS Service Discovery very simple to implement and troubleshoot.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for facilitating service discovery within a multi-link network, the multi-link network having a plurality of devices connected to a plurality of local links:
    determining a first message transmitted from a first device over a first link, the first device being one of the plurality of devices and the first link being one of the plurality of links, a first message payload including link-local information and non-link-local information;
    generating a second message for transmission over a second link of the plurality of links in response to determining the first message, the second message including the non-link-local information and excluding the link-local information of the first message;
    determining the first message at a customer edge router (CER) separating the first link from the second link, the CER providing prefix delegation to each of the plurality of devices and separating the first link from the second link such that communications associated with the service discovery between the first device and a second device requires relay through the CER, the second device being connected to the second link and one of the plurality of devices;
    determining the first message at the CER to include a first source address and a first destination address, the first source address being link-local to the first link and unusable over the second link with the second device due to the second device executing a verification process causing messages having addresses link-local to the first link to be automatically discarded;
    generating the second message at the CER to include a second source address and a second destination address, the second source address being link-local to the second link and different from the first source address; and
    transmitting the second message from the CER over the second link to the first destination address.

2. The method of claim 1 further comprising:
    determining the first message as being formatted according to multicast Domain Name System (mDNS) where at least a portion of the link-local information is included in a first resource record and at least a portion of the non-link-local information is included within a second resource record; and
    generating the second message to exclude the first resource record and to include the second resource record.

3. The method claim 1 further comprising:
    determining the link-local information to be included in a first resource record and at least a portion of the non-link-local information to be included within a second resource record; and
    generating the second message at the CER to exclude by dropping the first resource record and include the second resource record.

4. The method of claim 1 further comprising generating the second source address to match an address of the CER.

5. The method of claim 1 further comprising:
    determining the first destination address at the CER to be a multicast address, the multicast address being a default address specified in a discovery protocol utilized for the service discovery, the non-link-local information being formatted according to the discovery protocol to facilitate identifying a service available from the first device; and
    generating the second message at the CER to include the non-link-local information to identify the service and to include the second destination address to be the same as the first destination address.

6. The method of claim 1 further comprising:
    determining the first source address to be globally unique to the first device originating the first message; and
    generating the second source address to be globally unique to the CER.

7. The method of claim 1 further comprising:
    determining the first message as being formatted according to multicast Domain Name System (mDNS) and including a query unicast (QU) bit set to 1 when received at the second device;
    formatting the second message according to mDNS and to include a QU bit set to 0; and
    transmitting the second message such that the second message includes the QU bit set to 0 when transmitted from the CER.

8. The method of claim 1 further comprising:
    determining the first destination address to be link-local to the CER.

9. The method of claim 8 further comprising;
    wirelessly receiving the first message at the CER via the first link; and
    wirelessly transmitting the second message from the CER via the second link.

10. The method claim 8 further comprising:
    generating the second source address to be different than the first destination address.

11. A non-transitory computer-readable medium comprising a plurality of instructions operable with a router to facilitate messaging within a multi-link network, the multi-link network having a plurality of devices connected to a plurality of local links, the router being configured to relay messages between at least a first link and a second link of the plurality of links, wherein the router provides prefix delegation to each of the plurality of devices and separates the first link from the second link such that communications associated with the messaging between a first device of the plurality devices connected to the first link and a second device of the plurality of devices connected to the second link requires relay through the router, the plurality of instructions being sufficient for:
    determining a first message being transmitted over the first link, the first message having a first resource record containing link-local information and a second resource record containing non-link-local information;
    generating a second message for transmission over the second link, the second message including the second resource record and not the first resource record;
    determining the first message to include a first source address and a first destination address, the first source address being link-local to the first link and unusable over the second link with the second device due to the second device executing a verification process causing messages having addresses link-local to the first link to be automatically discarded;

generating the second message to include a second source address and a second destination address, the second source address being link-local to the second link and different from the first source address; and transmitting the second message over the second link to the first destination address.

12. The non-transitory computer-readable medium of claim 11 further comprising instructions sufficient for:

determining the first resource record to be a type A or a type AAAA record identifying the first source address; and determining the second resource record to be a type A or a type AAAA record identifying a non-link-local address for the first device.

13. The non-transitory computer-readable medium of claim 11 further comprising instructions sufficient for:

determining the first message to include a third resource recording identifying a service or other non-address related information associated with the first device; and generating the second message to include the third resource record.

14. The non-transitory computer-readable medium of claim 11 further comprising instructions sufficient for generating the second destination address to be the same as the first destination address, the first destination addressing being a multicast link-local address.

15. A non-transitory computer-readable medium comprising a plurality of instructions operable with a router to facilitate multicast Domain Name System (mDNS) messaging between at least a first link and a second link, the plurality of instructions being sufficient for:

determining a first mDNS message being transmitted from a first device over the first link, the first mDNS message including a query unicast (QU) bit set to 1;

generating a second mDNS message from the first mDNS message for transmission over the second link, the second message including one or more resource records included within the first mDNS message with a QU bit set to 0; and transmitting the second message from over the second link such that the second message includes the QU bit set to 0 when transmitted from the router;

determining the first mDNS message having a first resource record containing link-local information and a second resource record containing non-link-local information, the non-link-local information identifying a service available from the first device; and generating the second mDNS message to include the second resource record and not the first resource record, thereby facilitating discovery of the service over the second link.

16. The non-transitory computer-readable medium of claim 15 further comprising instructions sufficient for:

determining the first mDNS message to include a first source address and a first destination address, the first source address being a first link-local address for a-the first device transmitting the first message over the first link and the first destination address being a multicast link-local address; and generating the second mDNS message to include a second source address and a second destination address, the second source address being a second link-local address for the router for use over the second link and the second destination address being a multicast link-local address.

17. The non-transitory computer-readable medium of claim 15 further comprising instructions sufficient for:

generating a second destination address to be the a same as a first destination address;

determining an address verification utilized by a second device connected to the second link, the address verification process causing the second device to discard messages having source addresses outside of an address range, the first source addressing being within the address range; and selecting the second source to be within the address range.

* * * * *